(12) United States Patent
Schulz et al.

(10) Patent No.: US 7,574,145 B2
(45) Date of Patent: Aug. 11, 2009

(54) OPTICAL RECEIVER WITH DUO-BINARY ENCODER

(75) Inventors: Craig Schulz, Fremont, CA (US); Tom Mader, Los Gatos, CA (US); Song Quan Shang, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 503 days.

(21) Appl. No.: 11/323,745

(22) Filed: Dec. 30, 2005

(65) Prior Publication Data

US 2007/0154225 A1   Jul. 5, 2007

(51) Int. Cl.
 *H04B 10/06* (2006.01)
(52) U.S. Cl. .................................. 398/208
(58) Field of Classification Search .......... 398/140, 398/158, 183, 192, 194, 195, 202–214; 359/238
See application file for complete search history.

(56) References Cited

U.S. PATENT DOCUMENTS

| | | | | |
|---|---|---|---|---|
| 3,962,541 | A * | 6/1976 | Seidel | 375/376 |
| 4,807,251 | A * | 2/1989 | Shibano | 375/280 |
| 5,132,827 | A * | 7/1992 | Smith et al. | 398/147 |
| 5,805,022 | A * | 9/1998 | Bruccoleri et al. | 330/254 |
| 6,490,070 | B1 * | 12/2002 | Adams et al. | 398/131 |
| 7,233,399 | B2 * | 6/2007 | Schlenk et al. | 356/477 |
| 7,305,190 | B2 * | 12/2007 | Mayampurath et al. | 398/202 |
| 7,339,363 | B2 * | 3/2008 | Khorram et al. | 324/76.14 |
| 2003/0063397 | A1 * | 4/2003 | Inujima et al. | 359/808 |
| 2003/0113122 | A1 * | 6/2003 | Koga | 398/155 |
| 2004/0057733 | A1 * | 3/2004 | Azadet et al. | 398/183 |
| 2005/0226633 | A1 * | 10/2005 | Liu | 398/152 |
| 2005/0281563 | A1 * | 12/2005 | Li | 398/195 |
| 2006/0127104 | A1 * | 6/2006 | Harley et al. | 398/198 |
| 2006/0245582 | A1 * | 11/2006 | Rahyer et al. | 379/399.01 |

OTHER PUBLICATIONS

G. May, A Solheim, and J. Conradi, "Extended 10 Gb/s fiber transmission distance at 1538 nm using a duobinary receiver", IEEE Photonics Technology Letters, vol. 6, pp. 648-650 (1994).*
G. May, et al., "Extended 10 Gb/s Fiber Transmission Distance at 1538 nm Using a Duobinary Receiver", IEEE Photonics Technology Letters, vol. 6, No. 5, May 1994 (pp. 648-650).

* cited by examiner

*Primary Examiner*—Quan-Zhen Wang
(74) *Attorney, Agent, or Firm*—Blakely, Sokoloff, Taylor & Zafman LLP

(57) ABSTRACT

An optoelectronic circuit has an optical to electrical converter, a duo-binary encoder with an input coupled to an output of the converter, and a duo-binary decoder having an input coupled to the output of the encoder. A decision circuit having an input coupled to an output of the decoder is also provided. Other embodiments are also described and claimed.

8 Claims, 2 Drawing Sheets

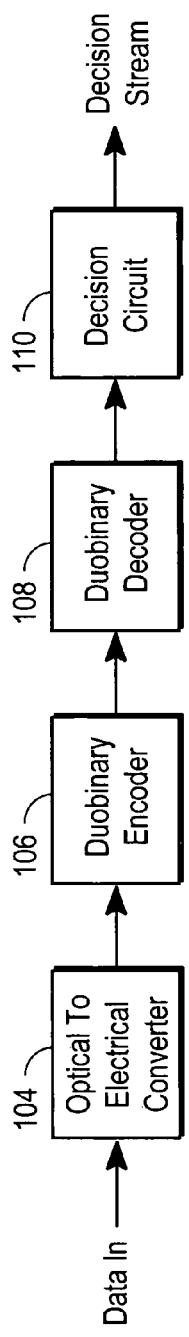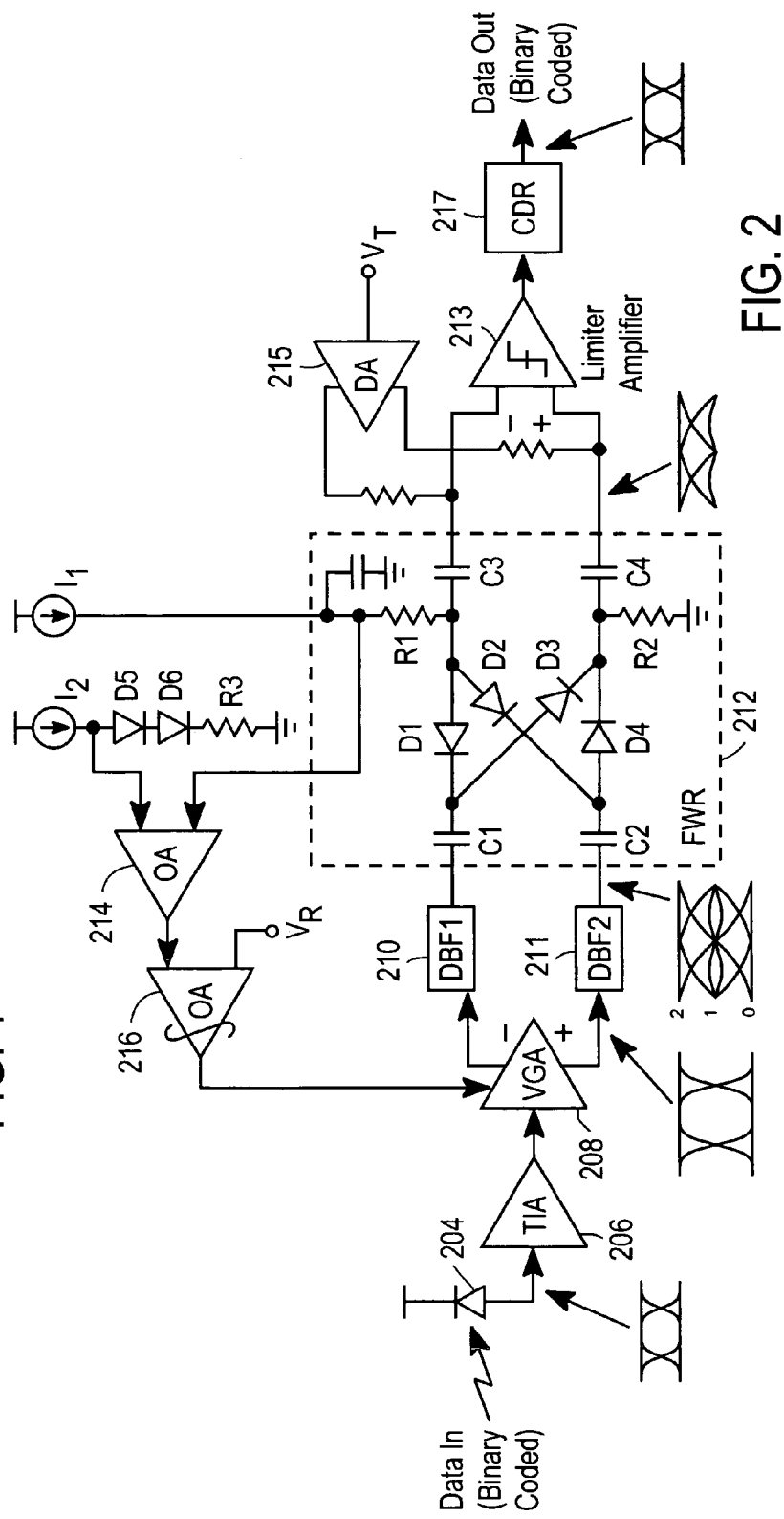
FIG. 1
FIG. 2

OPTICAL RECEIVER WITH DUO-BINARY ENCODER

An embodiment of the invention is related to optoelectronic circuits and, in particular, an optical receiver designed to receive a binary coded optical signal as input. Other embodiments are also described and claimed.

BACKGROUND

Optical receivers are used in optical transponders or transceivers, to enable communications equipment to operate over fiber optic lines. A typical problem is that high data rate optical signals can be significantly impaired by a characteristic of the optical fiber referred to as "fiber chromatic dispersion". High data rate in this case refers to 5 gigabits per second (Gpbs) and higher. Data that is transmitted over optical fiber is typically formatted into symbols, in accordance with a popular protocol referred to as NRZ OOK "non-return to zero on/off keying", a binary form of intensity modulation. NRZ OOK coding is an example of the more general binary coding format, where data is translated into a stream of symbols where each symbol can have one of only two values, and accordingly the transmission line signal has one of only two stable states.

More recently, another signaling format has been developed referred to as "duo-binary" which occupies less bandwidth than a binary format, for the same data rate. Duo-binary data formats are less susceptible to single mode fiber chromatic dispersion, as well as other link distortions. However, generating duo-binary signals on the transmit end of a fiber link typically requires the use of costly and relatively uncommon optical and electrical components.

BRIEF DESCRIPTION OF THE DRAWINGS

The embodiments of the invention are illustrated by way of example and not by way of limitation in the figures of the accompanying drawings in which like references indicate similar elements. It should be noted that references to "an" embodiment of the invention in this disclosure are not necessarily to the same embodiment, and they mean at least one.

FIG. 1 is a block diagram of an optoelectronic circuit in accordance with an embodiment of the invention.

FIG. 2 is a circuit schematic of an optical receiver that is designed to receive a binary coded optical input and performs duo-binary encoding.

DETAILED DESCRIPTION

Figure 3:
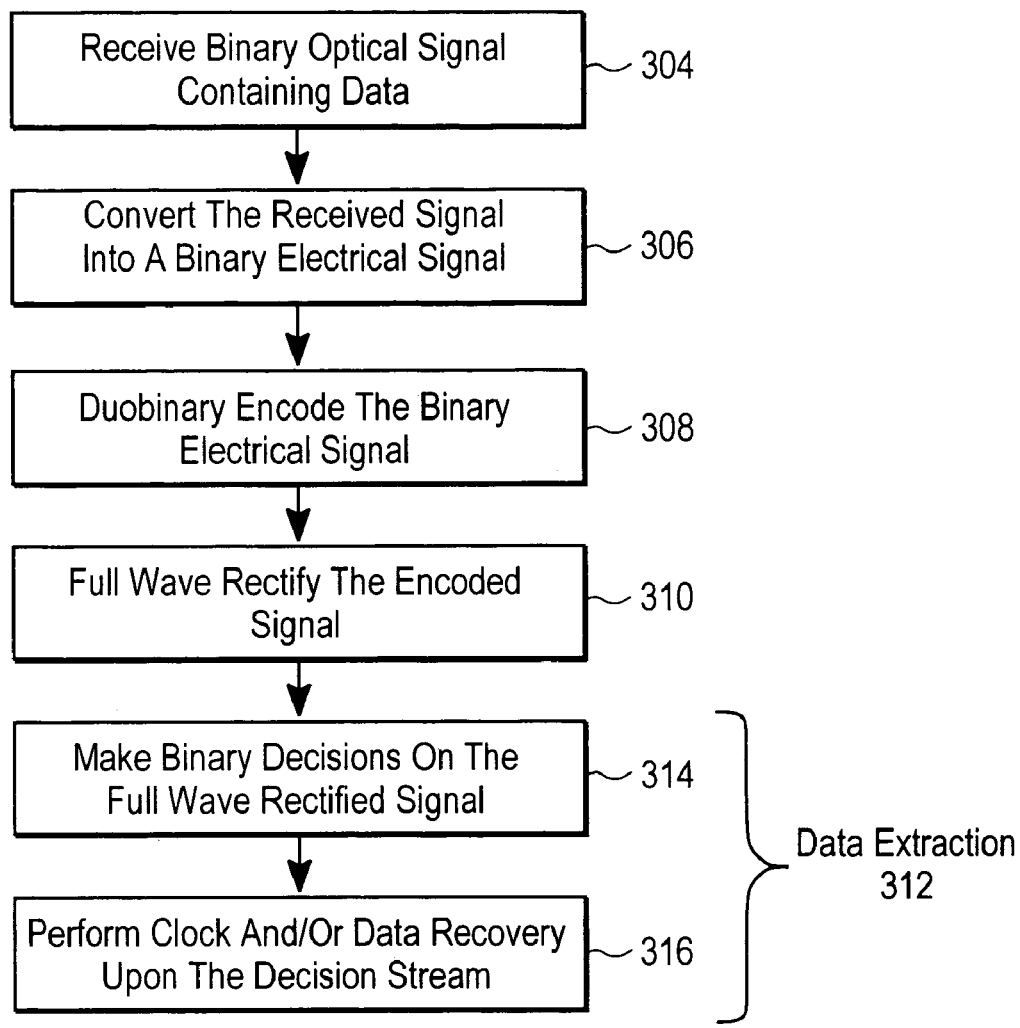
FIG. 3 is a flow diagram of operations in a receiver that is to receive a binary optical signal.

An embodiment of the invention is directed to a receiver that may be used to operate with longer fiber reaches, without the need for fiber dispersion compensation. FIG. 1 shows a block diagram of an optoelectronic circuit that can be used in such a receiver. An optical to electrical converter 104 has an input to receive data that has been encoded by a transmitter (not shown) into a binary coded signal and transmitted over an optical transmission line (e.g., an optical fiber line). The converter 104 converts photons of an input optical signal into electrons using, for example, a PIN or Avalanche Photo Diode (APD) photo diode detector. The converter may also include an amplifier stage that amplifies the resulting electrical signal from the detector.

Next in the chain is a duo-binary encoder 106 whose input is coupled to an output of the converter. The encoder 106 applies duo-binary encoding to the signal from the converter, to create a duo-binary, three level signal, e.g. referred to as (0,1,2). The duo-binary encoder 106 reduces high frequency signal distortions in the electrical signal (that were caused by fiber dispersion). Next, an output of the encoder 106 is coupled to an input of a duo-binary decoder 108. The decoder 108 performs a duo-binary decoding function, to recover a binary coded signal. A decision circuit 110 follows, whose input is coupled to an output of the decoder. The decision circuit 110 makes binary decisions on the output of the decoder 108 which may be a noisy signal. The decision circuit 110 makes clear the determinations of whether a symbol is a, for example, "1" or a "0", based on an essentially noisy, analog waveform obtained from the decoder 108. The resulting decision stream at the output of the decision circuit 110 may then be fed to a re-clocking circuit (not shown). That circuit re-clocks the data into the centers of their respective bit cells to provide a more accurate and more easily usable representation of the data stream that was transmitted at the other end of the optical link (not shown).

A receiver that uses the optoelectronic circuit of FIG. 1 can work with binary transmissions, and in particular NRZ OOK transmissions. In other words, the optical signal input to the converter 104 may be in a commonly transmitted binary format. Thus, there is the benefit of being able to use standard, low cost NRZ OOK transmitters with such a receiver. In addition, the receiver obtains most of the dispersion tolerance of duo-binary transmissions, by using the combination of the duo-binary encoder 106 and duo-binary decoder 108 at the receiving end, to help reduce high frequency signal distortions that were caused by fiber dispersion in the fiber optical fiber transmission line.

The data input to the optoelectronic circuit of FIG. 1, may be generated with standard, NRZ OOK transmit optics. In addition, the data to be transmitted should be differentially encoded (pre-coded) prior to transmission, such as described by the following equation:

$$W_k = X_k \oplus W_{k-1},$$

where "$\oplus$" symbolizes modulo-2 addition, $W_k$ is the $k^{th}$ output bit, and $X_k$ is the $k^{th}$ input bit (to the coder). This type of differential coding may be implemented using an exclusive-OR gate that is operating on two inputs, the input data stream and the exclusive-OR output delayed by one bit. This pre-coding operation helps reduce the chances of error propagation in duo-binary data. Note that in this case, the duo-binary data is generated at the receiver, rather than at the transmitter. Other ways of differentially encoding the transmitter data are possible.

Turning now to FIG. 2, a circuit schematic of an example receiver with a duo-binary encoder and decoder is shown. The receiver described here obtains most of the dispersion tolerance of duo-binary transmission, while using a standard low cost NRZ OOK transmitter (to generate the example binary coded optical signal that is input to the receiver). As suggested above, the data to be transmitted may be differentially encoded (pre-coded) prior to transmission. In the receiver depicted in FIG. 2, the photo diode detector 104 converts photons of the incident, binary optical signal into electrons. The signal, in this case, a binary coded current signal, is input to a transimpedance amplifier (TIA) 206 whose output is coupled to a variable gain amplifier (VGA) 208. Note the signal into a conventional TIA used in a OOK receiver is typically single ended. The output of the VGA 208, however, in this example is differential, that is there are complementary outputs, + and −. This helps reduce common mode noise in the rest of the receiver circuitry and provides the complementary inputs to the full wave rectifier circuit (described below). The TIA 206 and VGA 208 may be integrated into a single IC die for lower cost. Other configurations of an optical to electrical converter are possible.

Next in the chain are a pair of duo-binary filters (DBF) 210, 211 that perform an analog duo-binary encoding function on the binary data at the respective complementary outputs of the VGA 208. The DBF is an analog, low-pass filter having a defined response and bandwidth (e.g., approximately Rb/4) that creates a duo-binary, three level signal (0,1,2) as indicated at the outputs of the DBFs 210, 211. The DBF operates by introducing controlled, inter-symbol interference, to generate the three level signal. In some cases, the DBF reduces the signal to random noise power ratio by about 3 dB. However, high frequency signal distortion caused by fiber transmission line dispersion is also reduced by these DBFs 210, 211.

Note an alternative here of moving the DBF to between the TIA 206 and VGA 208, if the entire sequence starting with TIA 206, VGA 208 and the DBF is a linear system. That alternative may yield equivalent performance and will eliminate one of the DBFs 210,211. However, this may make it more difficult to integrate the TIA 206 and VGA 208 into a single IC chip. Although it is possible to integrate the DBFs 210, 211 with the TIA and VGA on the same chip, a custom IC design may be needed. Another implementation could use an electronically tunable DBF, to allow duo-binary encoding for different data rates or to switch to binary decoding (assuming in this example that the optical data input is binary NRZ coded). Yet another implementation could use a single, differential DBF, instead of the two, matched single ended DBFs 210, 211 shown. Other implementations for a duo-binary encoder are possible.

Following the DBFs 210, 211, a pair of series, broadband capacitors C1, C2 remove the average of the three level output, converting the (0,1,2) level signal to a (−1,0,1) level signal. This bipolar, three level signal drives the complementary inputs of a broadband, full wave rectifier (FWR) circuit 212, which performs an analog, duo-binary decoding function. For a pre-coded duo-binary input, the decoding function simply takes the absolute value of the signal waveform, Vo=absolute_value (Vin), after the DC component has been removed. In other words, the duo-binary decoder, for example, provides a "1" output if it receives either a "−1" or "1", while it has a "0" output if it receives a "0".

The FWR circuit 212 may be constructed as shown in FIG. 2, from a bridge network of four schottky diodes D1-D4 with matched electrical characteristics. A forward bias current I1 is applied to the FWR circuit, for improved rectifier performance. Resistors R1 and R2 are used to tap into the signal path to provide bias current to the diodes, as well as provide impedance matching. Other full wave rectifier circuit designs are possible.

Besides decoding the duo-binary signal from the DBFs, the FWR circuit 212 is also used to detect an average signal amplitude, which is the parameter that is driving a gain control feedback loop that is used in this embodiment, to stabilize the encoded signal at the input of the FWR into a proper range. A DC level of the FWR output changes as a function of the signal amplitude into the FWR. This detected DC voltage serves here as feedback for the gain control loop, which servos the gain of the VGA 208, to provide a relatively high signal level into the FWR 212. This helps reduce losses that are due to the FWR's non-ideal rectifier characteristics, therefore improving receiver performance. The signal detection output (taken from resistor R1 in this case) is temperature compensated using operational amplifier (or instrumentation amplifier) 214 and schottky diodes D5 and D6 that are matched to the FWR diodes D1-D4. Note the following example relative resistor values: R1=R2, and R3=2*(R1+R2). Also, regarding the current sources, in this example, I1=2*I2. The temperature compensation is achieved by comparing the sensed power to a reference voltage $V_R$ at the inputs of an operational amplifier that is configured as an integrator 216. The integrator filters the feedback signal, and drives the gain control input of the VGA 208 as shown. Other compensation circuits are possible.

Given that the output of the FWR 212 is binary, and in this case differential, the circuitry following the FWR 212 should be capable of supporting the full bandwidth of the binary coded, Data In signal. The complementary outputs of the FWR 212 in this example are fed to a limiter amplifier 213 which makes a binary decision on the noisy signal, determining whether the received data is a "1" bit or a "0" bit, based on whether the analog waveform is above or below a decision threshold voltage $V_T$. Broadband capacitors C3 and C4 between the FWR 212 and the limiter amplifier 213 pass the signal but isolate the DC operating points of the FWR 212 and limiter amplifier 213. Other types of decision circuits may alternatively be used here.

Next, the decision stream is fed to a clock and data recovery circuit (CDR) 217, which recovers a clock from its input, and re-clocks the data from the limiter amplifier 213 into the center of the data bit or cell. This provides an accurate representation of the received data stream, for use by subsequent higher layer logic (not shown).

Note that the limiter amplifier 213 and CDR 217 may be conventional circuits such as those particularly designed for NRZ binary coded data inputs, and are often integrated into a single chip. It should be noted that the input signal to the limiter amplifier 213 may be offset with an adjustable threshold voltage, to reduce bit error rate or improve receiver sensitivity by compensating for signal or noise asymmetries. This threshold voltage can be set once, or can be actively controlled in a servo loop, to reduce bit error rate in a link using forward error correction. The threshold voltage is converted to a differential signal in this case using a differential output amplifier (DA) 215 and is driven into the signal path by way of resistors tapping into the data path as shown. A variation here could be to use a single ended, instead of differential, threshold voltage tapping into one side of the limiter amplifier's differential input.

In another alternative, a microcontroller may be added along with digital to analog (D to A) converters, to provide digital control of the threshold voltage $V_T$, the current source bias I1, I2, and the reference $V_R$ for the gain control loop. A combination of analog to digital converters, D to A converters, and a microcontroller, could also be substituted for the gain control feedback path, taking the place of differential output amplifier 215 and integrator 216.

FIG. 3 is a flow diagram of operations in a receiver, in accordance with an embodiment of the invention. In operation 304, a binary optical signal containing data is received. As mentioned above, this may be an NRZ OOK transmitted signal that does not require special transmit side components, but rather may be generated using a relatively low cost, standard OOK transmitter such as an externally modulated laser. The received signal is then converted into a binary electrical signal (operation 306). This may be done using a conventional, photo diode detector. Next, the binary electrical signal is duo-binary encoded (operation 308) followed by being full wave rectified (operation 310). In most cases, the encoded signal will be relatively noisy, such that binary decisions will need to be made on the full wave rectified signal (operation 314). This is an example of a data extraction operation 312 which may also include clock and/or data recovery being performed upon the decision stream (operation 316) to reduce data timing jitter.

Figure 4:
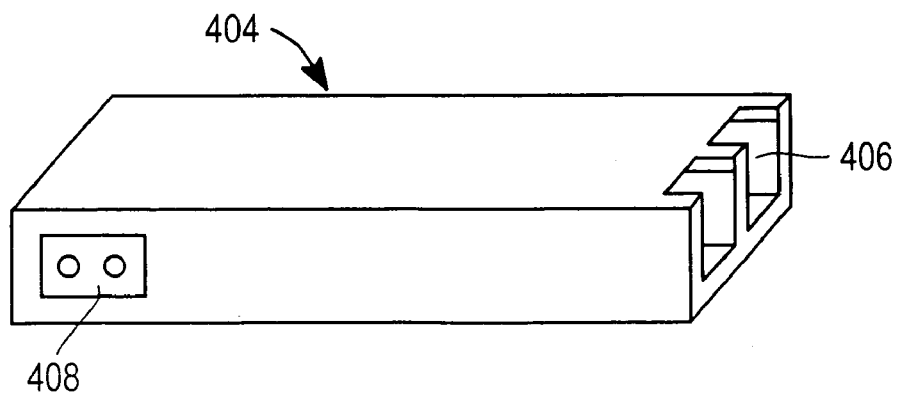
FIG. 4 is a conceptual diagram of an optical subassembly that may include both a receiver and a transmitter.

The above-described approach in FIG. 2 for implementing the receiver duo-binary encoding is an analog implementation, i.e. continuous time processing, rather than discrete time processing, where analog duo-binary filters 210, 211 are employed. If the CDR circuit is not included, then an optical receiver can be implemented in a relatively small form factor optical transceiver. Examples include a Small Form Factor, SFP, or SFP+ type of transceiver, or other similar design. An example of such an optical transceiver is shown in FIG. 4. The small form factor transceiver 404 has a pair of sockets 406 formed in a housing, to receive a pair of optical fiber plugs, and has an electrical output 408 that provides a differential, binary electrical signal containing the received data stream. The receiver circuitry is integrated entirely within the housing. The example circuit schematic of FIG. 2 shows how to implement a DBF and rectifier approach for duo-binary encoding and decoding in such a receiver. This may also help reduce cost and power dissipation within a small and low cost product such as XFP or X2 form factor optical communications elements.

The invention is not limited to the specific embodiments described above. For example, the entire functionality of FIG. 1 plus a CDR, could be implemented as a stand alone IC die, on a printed wiring board within a transceiver. As an alternative, the optoelectronic circuit may be integrated within a receive optical subassembly (as mentioned above). Accordingly, other embodiments are within the scope of the claims.

What is claimed is:

1. An optoelectronic circuit comprising:
 a receiver, the receiver having
 an optical to electrical converter;
 a duo-binary encoder having an input coupled to an output of the converter;
 a duo-binary decoder having an input coupled to an output of the encoder;
 a variable gain amplifier (VGA), wherein the duo-binary encoder has a pair of matched, analog filters coupled between a differential output of the VGA and input of the duo-binary decoder, the duo-binary decoder has a full wave rectifier with a dual input coupled to the differential output of the VGA; and
 a decision circuit having an input coupled to an output of the decoder.

2. The circuit of claim 1 further comprising:
 a clock and data recovery circuit having an input coupled to an output of the decision circuit.

3. The circuit of claim 1 wherein the decision circuit comprises a limiter amplifier having a differential input coupled to a dual output of the full wave rectifier.

4. The circuit of claim 1 further comprising:
 a transmitter to transmit a differentially encoded, binary optical signal.

5. An optoelectronic circuit comprising:
 a receiver, the receiver having
 an optical to electrical converter;
 a duo-binary filter having an input coupled to an output of the converter;
 a variable gain amplifier (VGA) coupled between the output of the converter and the input of the duo binary filter;
 a full wave rectifier (FWR) circuit having a pair of inputs coupled to respective outputs of the duo-binary filter;
 a decision circuit having a pair of inputs coupled to a pair of outputs of the full wave rectifier; and
 a feedback control loop to extract a DC level of the FWR circuit and on that basis control gain of the VGA to stabilize an input to the full wave rectifier.

6. The optoelectronic circuit of claim 5 wherein the duo-binary filter and full wave rectifier circuit are analog circuits.

7. The optoelectronic circuit of claim 5 further comprising a small form factor housing in which the converter, filter, full wave rectifier circuit, decision circuit, and feedback control loop are integrated.

8. The optoelectronic circuit of claim 5 wherein the full wave rectifier circuit comprises a plurality of resistors coupled to a plurality of diodes arranged as a bridge rectifier, to provide a) diode bias input and return and b) impedance matching to the full wave rectifier circuit.

* * * * *